United States Patent
Duron et al.

(10) Patent No.: US 7,290,180 B2
(45) Date of Patent: Oct. 30, 2007

(54) METHOD TO USE AN ALTERNATE I/O DEBUG PATH

(75) Inventors: Mike Conrad Duron, Pflugerville, TX (US); Mark David McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 10/932,704

(22) Filed: Sep. 2, 2004

(65) Prior Publication Data
US 2006/0059466 A1 Mar. 16, 2006

(51) Int. Cl.
*G06F 11/00* (2006.01)
(52) U.S. Cl. .................................................. 714/43
(58) Field of Classification Search .............. 714/43, 714/31
See application file for complete search history.

(56) References Cited

U.S. PATENT DOCUMENTS

| | | | |
|---|---|---|---|
| 4,347,563 A * | 8/1982 | Paredes et al. | 700/8 |
| 5,909,595 A * | 6/1999 | Rosenthal et al. | 710/38 |
| 6,282,674 B1 | 8/2001 | Patel et al. | |
| 6,823,375 B2 | 11/2004 | Lee et al. | |
| 6,832,342 B2 | 12/2004 | Fields et al. | |
| 6,944,854 B2 | 9/2005 | Kehne et al. | |
| 6,961,785 B1 | 11/2005 | Arndt et al. | |
| 2002/0087749 A1 * | 7/2002 | Tomioka | 710/1 |
| 2002/0124062 A1 | 9/2002 | Lee et al. | |
| 2004/0210793 A1 | 10/2004 | Chokshi et al. | |
| 2004/0215929 A1 * | 10/2004 | Floyd et al. | 712/16 |
| 2004/0260981 A1 | 12/2004 | Kitamorn et al. | |
| 2005/0081126 A1 | 4/2005 | Kulkarni et al. | |
| 2005/0144533 A1 | 6/2005 | LeVangia et al. | |
| 2005/0154929 A1 | 7/2005 | Ahrens et al. | |
| 2005/0160314 A1 | 7/2005 | Ahrens et al. | |
| 2005/0216796 A1 | 9/2005 | Carlos | |

OTHER PUBLICATIONS

U.S. Appl. No. 10/932,706, Duron et al., Method for Self-Diagnosing Remote I/O Enclosures with Enhanced FRU Callouts.
U.S. Appl. No. 10/932,700, Duron et al., Method for Non-Invasive Performance Monitoring and Tuning.

* cited by examiner

*Primary Examiner*—Nadeem Iqbal
(74) *Attorney, Agent, or Firm*—Duke W. Yee; Mark E. McBurney; Cathrine K. Kinslow

(57) ABSTRACT

A method, system, and computer product for aiding in the debugging of an I/O failure. When an I/O failure is detected on a RIO drawer, a data processing system uses the bulk power controller to provide an alternate path, rather than using the existing RIO links, to access registers on the I/O drawers. The system logs onto the bulk power controller, which provides a communications path between the data processing system and the RIO drawer. The communications path allows the data processing system to read the chip registers on the I/O drawer. The data processing system captures I/O failure information in the I/O drawer using the communications path, wherein the I/O failure information is used to debug the I/O failure.

31 Claims, 3 Drawing Sheets

METHOD TO USE AN ALTERNATE I/O DEBUG PATH

CROSS REFERENCE TO RELATED APPLICATIONS

The present invention is related to the following applications entitled "Method for Self-Diagnosing Remote I/O Enclosures with Enhanced FRU Callouts", Ser. No. 10/932,706, filed on Sep. 2, 2004; and "Method for Non-Invasive Performance Monitoring and Tuning", Ser. No. 10/932,700, filed on Sep. 2, 2004. All of the above related applications are assigned to the same assignee, and incorporated herein by reference.

BACKGROUND OF THE INVENTION

1. Technical Field

The present invention relates generally to an improved data processing system, and in particular to a method, system, and computer product for handling errors in a data processing system. Still more particularly, the present invention provides a method, system, and computer product for using an alternative path to capture failure data from input/output (I/O) drawers.

2. Description of Related Art

A multiprocessor data processing system is a data processing system that contains multiple central processing units. This type of system allows for logical partitioning in which a single multiprocessor data processing system may run as if the system were two or more independent systems. In such a system, each logical partition represents a division of resources in the system and operates as an independent logical system. Each of these partitions is logical because the division of resources may be physical or virtual. For example, a multiprocessor data processing system may be partitioned into multiple independent servers, in which each partition has its own processors, main storage, and input/output devices.

Many systems include multiple remote input/output subsystems in which each subsystem includes a bridge or some other interface to connect the subsystem with other portions of the data processing system through a primary or main input/output hub. Each of these remote I/O subsystems is also referred to as a "RIO drawer". Each of these RIO drawers may include peripheral components, such as, for example, hard disk drives, tape drives, or graphics adapters.

RIO drawers are typically physically separated from the processors and memory components of the computer. The RIO drawers and their components are connected to the main computer using RIO network cables which allow the I/O devices contained within the RIO drawers to function with the remainder of the computer as if they were on the system bus.

Some existing systems, such as the IBM eServer pSeries Regatta 690 and the IBM eServer pSeries and iSeries Squadrons systems, products of International Business Machines Corporation in Armonk, N.Y., do not have JTAG access to the RIO drawers. Instead, these systems use RIO cables to access the remote I/O drawers. RIO links are used to connect the central electronics complex (CEC) to a host of I/O devices. These links provide communication paths from the processors in the CEC to the I/O drawers. When an I/O error occurs, a kernel debugger (KDB) or hypervisor may only access the I/O failure information through the RIO cables.

A problem with having the access to the I/O drawers only allowed through the RIO cables is that if an I/O error occurs in the drawers and the RIO path is not functional, it may be difficult or even impossible to access the register information in the remote I/O drawers. As a result, the system of CEC may not be able to read all of the required registers to make a complete diagnosis of the I/O failure, as there is no way to dump ring buffer data from the chips on the I/O drawers. This ring buffer data may provide a hardware or software developer with needed data to diagnose a field failure. In addition, when using the KDB/hypervisor RIO path to read the I/O drawers, a read to an invalid address in the I/O drawer causes the KDB session to fail, and may cause the entire system to fail as well. Thus, if an I/O error occurs in the RIO drawers in a system that does not have JTAG access, the system using only RIO links may not be able to read all of the required registers to make a complete diagnosis of the problem, and, if it attempts to do so, may result in a checkstop system. A system developer must therefore be careful of generating an illegal address.

Therefore, it would be advantageous to have an improved method, system, and computer product for aiding in the debugging of an I/O failure.

SUMMARY OF THE INVENTION

The present invention provides a method, system, and computer product for aiding in the debugging of an I/O failure. When an I/O failure is detected on a RIO drawer, a data processing system uses the bulk power controller to provide an alternate path, rather than using the existing RIO links, to access registers on the I/O drawers. The system logs onto the bulk power controller, which provides a communications path between the data processing system and the RIO drawer. The communications path allows the data processing system to read the chip registers on the I/O drawer. The data processing system captures I/O failure information in the I/O drawer using the communications path, wherein the I/O failure information is used to debug the I/O failure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
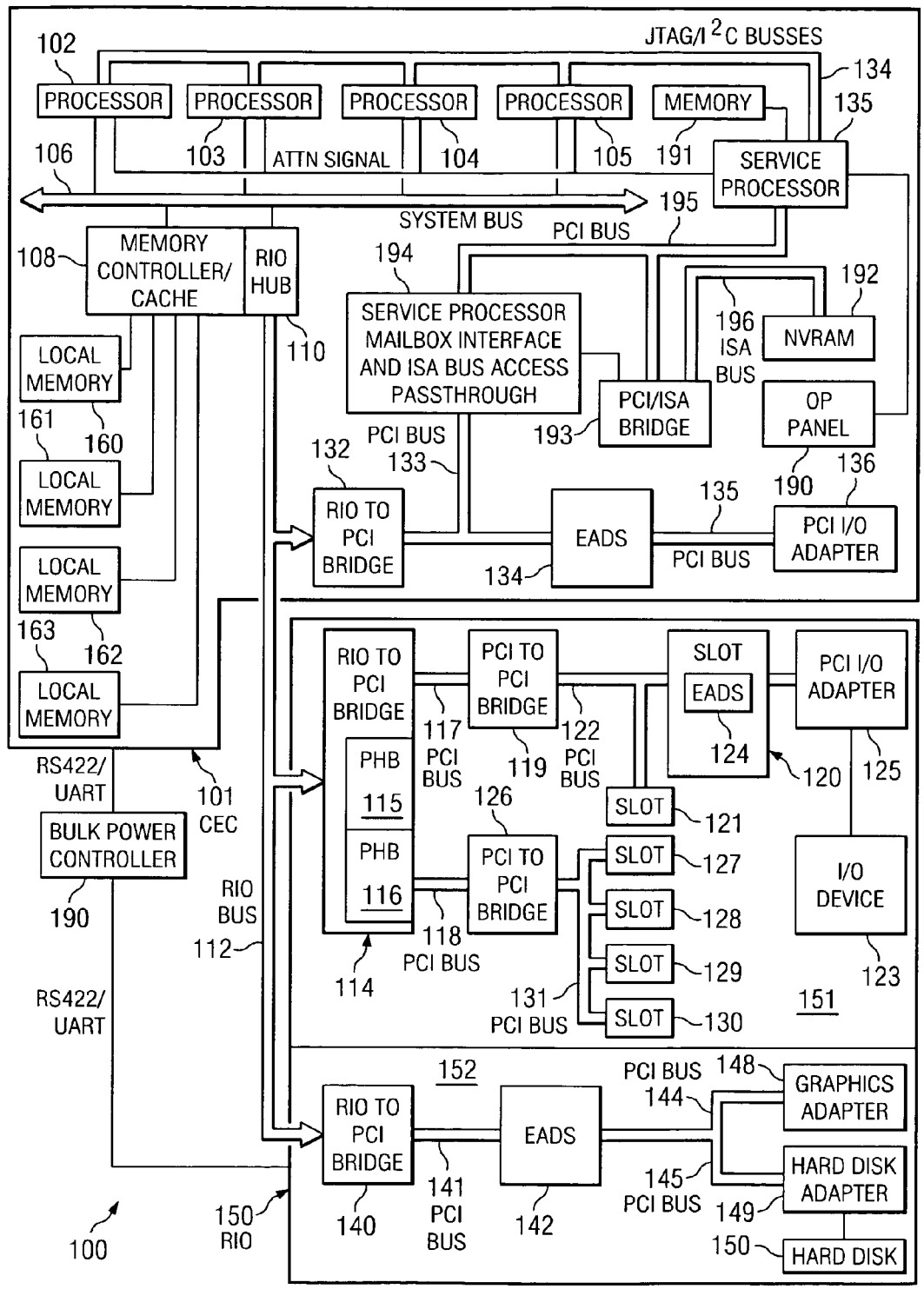
FIG. 1 is a block diagram of an exemplary data processing system in which the present invention may be implemented in accordance with the present invention.

With reference now to the figures, and in particular with reference to FIG. 1, a block diagram of a data processing system in which the present invention may be implemented is depicted. Data processing system 100 includes a central electronic complex 101 which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160-163. RIO Hub 110 is connected to system bus 106 and provides an interface to RIO bus 112. Memory controller/cache 108 and RIO Hub 110 may be integrated as depicted.

Data processing system 100 is a logically partitioned data processing system Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots, to which PCI I/O adapters may be coupled, such as slots 120, 121, and 127-130, graphics adapter 148, and hard disk adapter 149 may each be assigned to different logical partitions. In this case, graphics adapter 148 provides a connection for a display device (not shown), while hard disk adapter 149 provides a connection to control hard disk 150.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance, also called an image, of the AIX operating system may be executing within partition P2, and a Windows 2000 operating system may be operating within logical partition P3. Windows 2000 is a product and trademark of Microsoft Corporation of Redmond, Wash.

Data processing system 100 includes RIO enclosure 150, which includes a plurality of I/O drawers 151 and 152 connected to RIO bus 112. RIO to PCI bridge 114 in I/O drawer 151 is connected to RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either four or eight slots are supported by each PHB. PCI to PCI bridge 126 is coupled to slots 127-130 using PCI bus 131.

Each slot includes an EADS chip to which a PCI I/O adapter may be attached. For example, slot 120 includes EADS 124. An I/O adapter may be inserted into a slot and thus coupled to an EADS. For example, I/O adapter 125 is inserted into slot 120 and coupled to EADS 124. An I/O device may be coupled to data processing system 100 utilizing an I/O adapter. For example, as depicted, I/O device 123 is coupled to I/O adapter 125.

A memory mapped graphics adapter 148 may be connected to RIO bus 112 through PCI bus 144, EADS 142, PCI bus 141, and RIO to PCI bridge 140. A hard disk 150 may be coupled to hard disk adapter 149 which is connected to PCI bus 145. In turn, this bus is connected to EADS 142, which is connected to RIO to PCI Bridge 140 by PCI bus 141.

A RIO to PCI bridge 132 provides an interface for a PCI bus 133 to connect to RIO bus 112. PCI I/O adapter 136 is connected to EADS 134 by PCI bus 135. EADS 132 is connected to PCI bus 133. This PCI bus also connects RIO to PCI bridge 132 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102-105 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (host) processors 102-105, memory controller/cache 108, and RIO Hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 102-105, memory controller/cache 108, and RIO Hub 110. Any error information for failures detected during the BISTS, BATs, and memory tests are gathered and reported by service processor 135.

If a meaningful/valid configuration of system resources is still possible after taking out the elements found to be faulty during the BISTS, BATS, and memory tests, then data processing system 100 is allowed to proceed to load executable code into local (host) memories 160-163. Service processor 135 then releases the host processors 102-105 for execution of the code loaded into host memory 160-163. While the host processors 102-105 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 102-105, local memories 160-163, and RIO Hub 110. Service processor 135 is responsible for saving and reporting error information related to all the monitored items in data processing system 100.

Data processing system 100 is powered by bulk power controller (BPC) 190, which provides power to various components in the data processing system, such as, for example, processors and I/O enclosures. For instance, bulk power controller 190 distributes power to CEC 101, service processor 135, and RIO enclosure 150 using I$^2$C paths. Each I$^2$C path is primarily used for power control.

Data processing system 100 may be implemented using various commercially available computer systems. For example, data processing system 100 may be implemented using IBM eServer pSeries Regatta 690 system or the IBM eServer pSeries Squadron system, both products available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

As mentioned above, some systems, such as the IBM eServer pSeries Regatta 690 server and the IBM eServer pSeries Squadron server, use only RIO cables to connect the processors in the CEC to the I/O drawers. The mechanism of the present invention allows for reading the chip registers on the I/O drawer to aid in debugging the I/O failure by providing an alternative path to the I/O drawers. The alternative path provided by the bulk power controller provides access to the I/O drawer registers and also provides access to registers that the RIO path cannot. The path provided by the bulk power controller interface allows the system to read all of the chip registers on the I/O drawers, including the JTAG-accessible registers. When an I/O error is detected, the system may login to the bulk power controller. The system uses the alternative path provided by the bulk power controller to access the I/O drawers. Commands are sent to the bulk power controller to a distributed converter assembly (DCA) in the I/O drawer, which has an $I^2C$ path to the chip registers on the drawers. The system reads the chip registers on the I/O drawer and analyzes the register information to diagnose the I/O failure.

The mechanism of the present invention allows for accessing the chip registers on the I/O drawer even if the functional link, or RIO link, is not working properly. For example, when an I/O error is detected and the functional path is working, if a user enters an illegal address from the kernel debugger, the functional path will break. In this situation, the user may rely on the alternative path provided by the bulk power controller to obtain register information and debug the I/O failure. The user may also choose to use the alternative path without entering an address, simply because the alternative path is easier to use than the functional path. In addition, if the functional path is not working and the system is being used for bringup or debug of remote I/O links, the user may use the alternative path to read the registers on the I/O drawer in order to reduce bringup and debug time. For instance, bringup typically involves installing available firmware onto the system and running the firmware. As system errors are encountered, the error is debugged to the root cause and necessary code changes are made. Without using the alternative path, bringup of the RIO links is much more difficult since there is only visibility to the registers on one end (i.e., the registers that are accessible via JTAG from the CEC). Using the alternative path allows for viewing registers on both ends, thereby decreasing the time necessary to determine the root cause of the failure.

Debug time, as well as debug power sequencing problems, may also be reduced if access to the alternative path is available immediately after power to the I/O device is turned on. In this situation, the functional link does not need to be initialized and code does not need to be running on the service processor. Furthermore, the mechanism of the present invention aids in debugging an I/O failure by capturing failure data from the I/O drawers. Using the alternative path provided by the bulk power controller, the system or a customer engineer (CE) may capture a ring dump of the chips on the I/O drawer. The system may perform the ring dump itself, or a CE may collect the dump from another workstation connected to the system. Capturing failure data in this manner may be performed in the lab, but also in the field to get necessary debug data to identify the root cause of the I/O failure.

Figure 2:
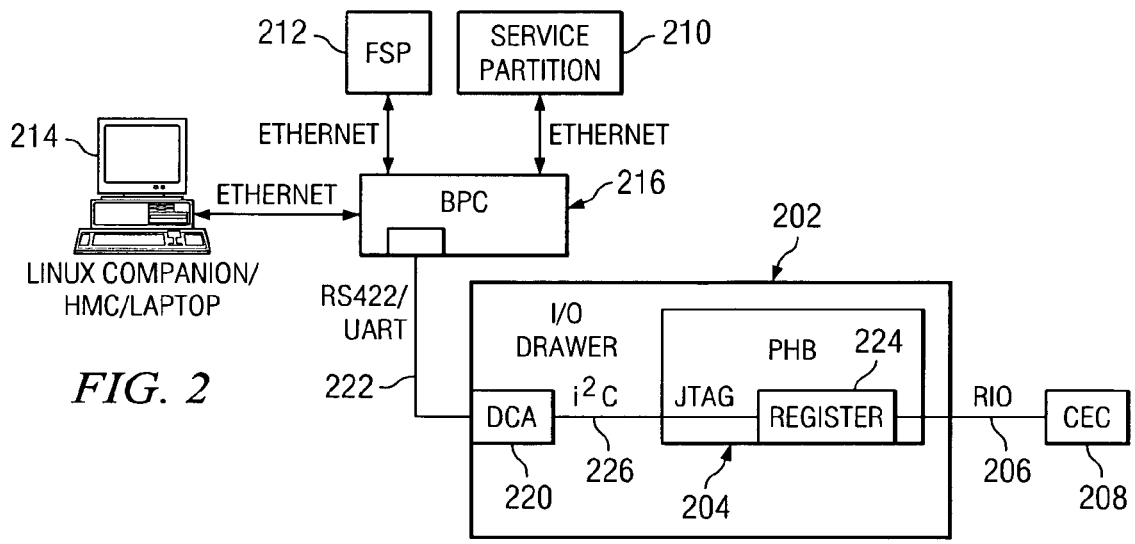
FIG. 2 is a block diagram of a system providing an alternative path for aiding in the debugging of an I/O failure in accordance with a preferred embodiment of the present invention.

With reference now to FIG. 2, a block diagram of a system providing an alternative path for aiding in the debugging an I/O failure is depicted in accordance with a preferred embodiment of the present invention. The components in FIG. 2 may be implemented in data processing system 100 in FIG. 1.

System 200 includes one I/O drawer 202. I/O drawer 202 contains one PCI host bridge (PHB) 204. However, although depicted with one I/O drawer 202 and one PHB 204, one skilled in the art will recognize that more I/O drawers and PHBs may be included than depicted in FIG. 2. Each PHB may support, for example, between 4 and 8 PCI expansion slots, which may be implemented, for example, as I/O adapter 136 in FIG. 1.

In existing systems, RIO link 206 may be used to connect central electronics complex (CEC) 208 to I/O drawer 202. As CEC 208 comprises one or more system processors and memory, these RIO links provide the communication path from the processors in the CEC to the I/O drawers.

However, as illustrated in FIG. 2, system 200 may use a communications path provided by the bulk power controller to access chip registers to aid in the debug of a failure on the I/O drawer. In the illustrative example, various components, such as service partition 210, flexible service processor (FSP) 212, and service console 214, are allowed to access to chip registers on the drawer. As shown, service console 214 may comprise, for example, a Linux companion system, a Hardware Management Console (HMC), or a laptop, each of which enable a system administrator to monitor system 200 for hardware problems, although other systems may be used to implement the features of the present invention.

Service partition 210, FSP 212, and service console 214 may access the chip registers on the I/O drawer via bulk power controller 216. A connection interface, such as ethernet interface 218 or System Power Control Network (SPCN) interface 220, may be used to connect service partition 210, FSP 212, and service console 214 to bulk power controller 216. System 200 uses service partition 210, FSP 212, and service console 214 to login to bulk power controller 216. As bulk power controller 216 is connected to I/O drawer 202, service partition 210, FSP 212, and service console 214 may then send commands to I/O drawer 202.

System 200 send commands to distributed converter assembly (DCA) 220 within I/O drawer 202 using RS422/UART connection 222, which connects bulk power controller 216 to DCA 220. RS422 is an Electronic Industries Alliance specification that deals with data communication. DCA 220 is plugged directly into I/O drawer 202 and receives power from bulk power controller 216. DCA 220 converts the power and supplies precise voltages required by the logic and memory circuitry of the I/O drawer. Within I/O drawer 202, DCA 220 includes an $I^2C$ path to the chip registers on the drawer. System may use $I^2C$ connection 226 to access chip register 224.

Figure 3:
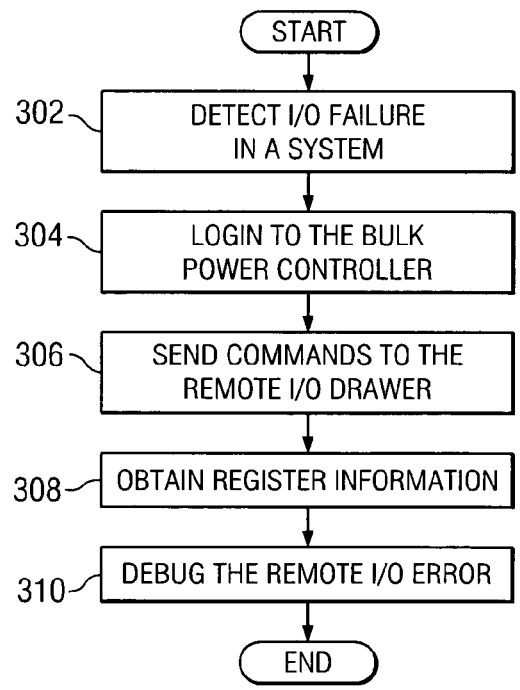
FIG. 3 is a flowchart of a process for debugging remote I/O failures without using the RIO bus in accordance with the present invention.

FIG. 3 is a flowchart of a process for debugging remote I/O failures without using the RIO bus in accordance with the present invention. This process may be implemented if the functional link, or RIO link, to the remote I/O drawers is broken. This process may also be implemented when the RIO link is not broken, but the user wants to avoid the adverse consequences of entering an illegal address when trying to access the I/O drawers using the RIO links. The process described in FIG. 3 may be implemented in a data processing system, such as data processing system 100 shown in FIG. 1.

The process begins with detecting an I/O failure in a system (step 302). When the I/O failure is detected, the system is sitting in the operating system debugger and the functional path, or RIO link, between the CEC and the remote I/O drawers is working properly. The system may use the service partition, processor, or console that detected the I/O failure or, alternatively, another service partition, processor, or console to login to the bulk power controller (step 304). Once the system is logged into the bulk power controller, the system may use the alternative path provided by the bulk power controller to send commands to the remote I/O drawer (step 306), without having to use the path provided by the RIO cables. In this manner, the register information on the remote I/O drawers may be accessed even if the RIO link is broken.

The system may now capture I/O failure information in the I/O drawer using the alternative path (step 308). This I/O failure information is then used to debug the remote I/O error (step 310).

Figure 4:
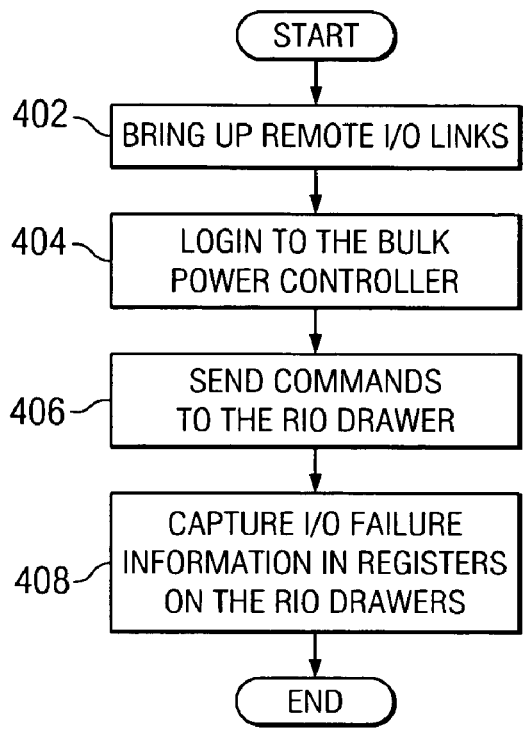
FIG. 4 is a flowchart of a process for debugging remote I/O failures without using the RIO bus in accordance with the present invention.

FIG. 4 is a flowchart of a process for debugging remote I/O failures without using the RIO bus in accordance with the present invention. The process described in FIG. 4 may be implemented in a data processing system, such as data processing system 100 shown in FIG. 1.

The process begins with the system being used for bringup of remote I/O links (step 402). The system may use a service processor, service partition, and/or service console to perform system configuration. The system may use the service partition, processor, or console that detected the I/O failure or, alternatively, another service partition, processor, or console to login to the bulk power controller (step 404). Once the system is logged into the bulk power controller, the system may use the alternative path provided by the bulk power controller to send commands to the remote I/O drawer (step 406), without having to use the path provided by the RIO cables. The system may then capture I/O failure information in the registers on the remote I/O drawers (step 408). In this manner, using the alternative path in this manner allows for reducing the bringup time for the remote I/O links.

Figure 5:
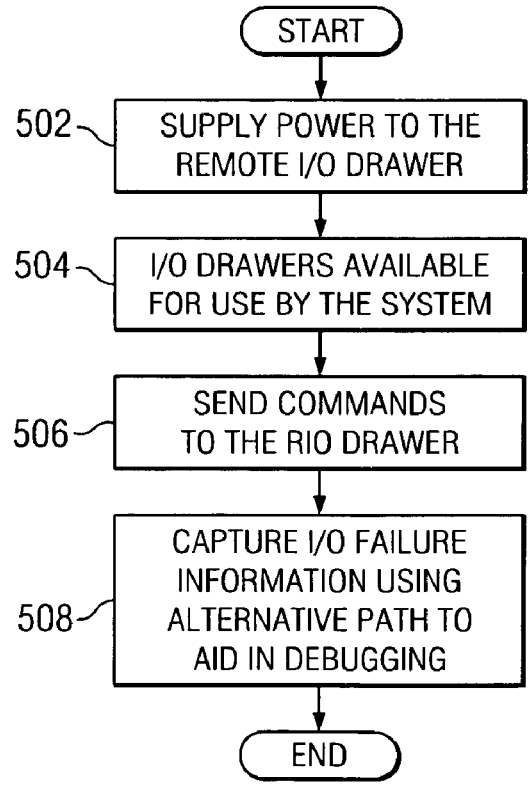
FIG. 5 is a flowchart of a process for debugging remote I/O failures without using the RIO bus in accordance with the present invention.

FIG. 5 is a flowchart of a process for debugging remote I/O failures without using the RIO bus in accordance with the present invention. The advantage of this process is that the functional link, or RIO link, does not need to be initialized, and code does not need to be running on the service processor. The process described in FIG. 5 may be implemented in a data processing system, such as data processing system 100 shown in FIG. 1.

The process begins with supplying power to the remote I/O drawer (step 502). Soon after the power to the I/O drawer is turned on, the alternative path to the remote I/O drawers is available for use by the system (step 504). The alternative path is available to the system by automatically logging into the bulk power controller when power is supplied to the remote I/O drawers. The system may use a service partition, processor, or console to login to the bulk power controller. Once the system is logged into the bulk power controller, the system may use the alternative path provided by the bulk power controller to send commands to the remote I/O drawer (step 506), without having to use the path provided by the RIO cables. The system may now capture the I/O failure information on the I/O drawer using the alternative path to aid in debugging (step 508).

Thus, the mechanism of the present invention aids in the debugging process without using the RIO bus. Using the alternate path provided by the bulk power controller, the system captures failure data necessary debug data to identify the root cause of the I/O failure. The system may access the chip registers on the I/O drawer even if the functional link, or RIO link, is not working properly. In this situation, the user may rely on the alternative path provided by the bulk power controller to obtain I/O failure information to debug the I/O failure. In addition, if the functional path is not working and the system is being used for bringup or debug of remote I/O links, the user may use the alternative path to read the registers on the I/O drawer in order to reduce bringup and debug time. Debug time, as well as debug power sequencing problems, may also be reduced if access to the alternative path is available immediately after power to the I/O device is turned on. In this situation, the functional link does not need to be initialized and code does not need to be running on the service processor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for debugging input/output failures in a data processing system, comprising:

responsive to detecting an input/output failure in a remote input/output drawer, logging onto a bulk power controller, wherein the bulk power controller provides a communications path between the data processing system and the remote input/output drawer, and wherein the communications path allows the data processing system to read chip registers on the remote input/output drawer; and capturing input/output failure information in the remote input/output drawer using the communications path, wherein the input/output failure information is used to debug the input/output failure.

2. The method of claim 1, wherein capturing input/output failure information provides necessary debug data to identify the root cause of the input/output failure.

3. The method of claim 1, wherein capturing input/output failure information in the remote input/output drawer allows for reducing bringup time for remote I/O links.

4. The method of claim 1, wherein the chip registers include JTAG-accessible registers.

5. The method of claim 1, wherein the communications path includes an I²C link.

6. The method of claim 1, wherein one of an ethernet interface or System Power Control Network interface is used to connect the data processing system to the bulk power controller.

7. The method of claim 1, wherein the bulk power controller is connected to a distributed converter assembly within the remote input/output drawer using a RS422/UART link.

8. The method of claim 1, wherein the data processing system sends commands to the distributed converter assembly using the RS422/UART link.

9. A method for debugging input/output failures in a data processing system, comprising:
supplying power to a remote input/output drawer;
responsive to power being supplied to the remote input/output drawer, automatically providing a communications path between the data processing system and the remote input/output drawer via a bulk power controller, wherein the communications path allows the data processing system to send commands to the remote input/output drawer; and
capturing input/output failure information in the remote input/output drawer using the communications path, wherein the input/output failure information is used to debug an input/output failure.

10. The method of claim 9, wherein the communications path is the only communications path connected to the remote input/output drawer.

11. A data processing system for debugging input/output failures, comprising:
logging means for logging onto a bulk power controller in response to detecting an input/output failure in a remote input/output drawer, wherein the bulk power controller provides a communications path between the data processing system and the remote input/output drawer, and wherein the communications path allows the data processing system to read chip registers on the remote input/output drawer; and
capturing means for capturing input/output failure information in the remote input/output drawer using the communications path, wherein the input/output failure information is used to debug the input/output failure.

12. The data processing system of claim 11, wherein capturing input/output failure information provides necessary debug data to identify the root cause of the input/output failure.

13. The data processing system of claim 11, wherein capturing input/output failure information in the remote input/output drawer allows for reducing bringup time for remote I/O links.

14. The data processing system of claim 11, wherein the chip registers include JTAG-accessible registers.

15. The data processing system of claim 11, wherein the communications path includes an I²C link.

16. The data processing system of claim 11, wherein one of an ethernet interface or System Power Control Network interface is used to connect the data processing system to the bulk power controller.

17. The data processing system of claim 11, wherein the bulk power controller is connected to a distributed converter assembly within the remote input/output drawer using a RS422/UART link.

18. The data processing system of claim 11, wherein the data processing system sends commands to the distributed converter assembly using the RS422/UART link.

19. A data processing system for debugging input/output failures, comprising:
supplying means for supplying power to a remote input/output drawer;
providing means for automatically providing a communications path between the data processing system and the remote input/output drawer via a bulk power controller in response to power being supplied to the remote input/output drawer, wherein the communications path allows the data processing system to send commands to the remote input/output drawer; and
capturing means for capturing input/output failure information in the remote input/output drawer using the communications path, wherein the input/output failure information is used to debug an input/output failure.

20. The data processing system of claim 19, wherein the communications path is the only communications path connected to the remote input/output drawer.

21. A computer program product in a computer readable medium for debugging input/output failures, comprising:
first instructions for logging onto a bulk power controller in response to detecting an input/output failure in a remote input/output drawer, wherein the bulk power controller provides a communications path between the data processing system and the remote input/output drawer, and wherein the communications path allows the data processing system to read chip registers on the remote input/output drawer; and
second instructions for capturing input/output failure information in the remote input/output drawer using the communications path, wherein the input/output failure information is used to debug the input/output failure.

22. The computer program product of claim 21, wherein capturing input/output failure information provides necessary debug data to identify the root cause of the input/output failure.

23. The computer program product of claim 21, wherein capturing input/output failure information in the input/output drawer allows for reducing bringup time for remote I/O links.

24. The computer program product of claim 21, wherein the chip registers include JTAG-accessible registers.

25. The computer program product of claim 21, wherein the communications path includes an I²C link.

26. The computer program product of claim 21, wherein one of an ethernet interface or System Power Control Network interface is used to connect the data processing system to the bulk power controller.

27. The computer program product of claim 21, wherein the bulk power controller is connected to a distributed converter assembly within the remote input/output drawer using a RS422/UART link.

28. The computer program product of claim 21, wherein the data processing system sends commands to the distributed converter assembly using the RS422/UART link.

29. A computer program product in a computer readable medium for debugging input/output failures, comprising:
first instructions for supplying power to a remote input/output drawer;

second instructions for automatically providing a communications path between the data processing system and the remote input/output drawer via a bulk power controller in response to power being supplied to the remote input/output drawer, wherein the communications path allows the data processing system to send commands to the remote input/output drawer; and third instructions for capturing input/output failure information in the remote input/output drawer using the communications path, wherein the input/output failure information is used to debug an input/output failure.

30. The computer program product of claim 29, wherein the communications path is the only communications path connected to the remote input/output drawer.

31. A data processing system for debugging input/output failures, comprising:

a remote input/output drawer;

a bulk power controller, wherein the bulk power controller provides a communications path between the data processing system and the remote input/output drawer, and wherein the communications path allows the data processing system to read chip registers on the remote input/output drawer; and a service processor, wherein the service processor logs onto the bulk power controller in response to detecting an input/output failure in the remote input/output drawer, and wherein the service processor captures input/output failure information in the remote input/output drawer using the communications path, and wherein a user can utilize the input/output failure information to debug the input/output failure.

* * * * *